United States Patent [19]
Cathey

[11] 3,916,231
[45] Oct. 28, 1975

[54] INDUCTION MOTOR
[75] Inventor: Jimmie J. Cathey, Longview, Tex.
[73] Assignee: Marathon LeTourneau Company, Longview, Tex.
[22] Filed: Dec. 26, 1973
[21] Appl. No.: 427,539

[52] U.S. Cl. .................... 310/62; 310/89; 310/90; 219/209
[51] Int. Cl.² ......................................... H02K 9/06
[58] Field of Search ............ 310/58, 52, 53, 58, 61, 310/62, 63, 65, 66, 89, 42, 90, 254, 258; 308/77; 219/209

[56] References Cited
UNITED STATES PATENTS

| | | | |
|---|---|---|---|
| 2,157,191 | 5/1939 | Sinnett | 310/62 |
| 2,451,124 | 10/1948 | Smith | 219/209 |
| 2,469,820 | 5/1949 | Fuge | 310/58 |
| 3,518,468 | 6/1970 | Wightman | 310/258 |
| 3,531,667 | 9/1970 | Barton | 310/258 |
| 3,544,820 | 12/1970 | Wightman | 310/89 |
| 3,610,975 | 10/1971 | Onjanow | 310/57 |
| 3,708,707 | 1/1973 | Kranz | 310/258 |
| 3,740,599 | 6/1973 | Dochterman | 310/52 |
| 3,786,289 | 1/1974 | Baclawski | 310/90 |

*Primary Examiner*—R. Skudy
*Attorney, Agent, or Firm*—Jack R. Springgate; Joe E. Edwards; M. H. Gay

[57] ABSTRACT

An induction motor having a frame, end bells closing the ends of said frame, a shaft, lubricated bearings rotatably supporting said shaft in said end bells, means sealing between said shaft and said end bells, a rotor mounted on said shaft, a stator, rings supported on said end bells, clips supported by said rings and supporting said stator, a pair of annular heaters, one of said heaters mounted on the inner surface of each of said end bells and in close spaced relationship to said seals and said bearings for heating them and positioned to heat air circulating within said motor. This abstract is neither intended to define the invention of the application which, of course, is measured by the claims, nor is it intended to be limiting as to the scope of the invention in any way.

5 Claims, 3 Drawing Figures

INDUCTION MOTOR

BACKGROUND OF THE INVENTION

Induction motors have been constructed to have vanes to circulate air through air passages to transfer the heat generated within the motor by electrical and magnetic losses in the rotor and stator assemblies. Some prior patent such as my U.S Pat. No. 3,531,668 suggest means for cooling induction motors. While induction motors may need cooling during operation it is often desirable to provide heating to assure proper mechanical freedom during start-up and operation under extremely adverse conditions. Also, such heating will reduce harmful moisture condensation that results from thermal cycling. One prior U.S. Pat. No. 2,451,124 to F. T. Smith has suggested the inclusion of a heater in the end bell of a motor enclosed within an annular recess surrounding the bearing.

One particular problem in induction motors is to maintain the necessary concentricity between the rotor and stator assemblies when it is desirable to make the metal frame readily removable. When a stator assemblies are supported from the frame, great care must be taken to assure the necessary stator-rotor concentricity.

Summary

The present invention relates to an improved induction motor.

An object of the present invention is to provide an improved totally enclosed induction motor which operates effectively in adverse service.

Another object is to provide an improved induction motor in which the components are maintained at a desired operating temperature when operating and when shut down.

A further object is to provide an improved, totally enclosed induction motor using a stator assembly produced by methods commonly used for the production of stator assemblies for open-type induction motors.

Still another object is to provide an improved totally enclosed induction motor in which the stator assembly is easily removable.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
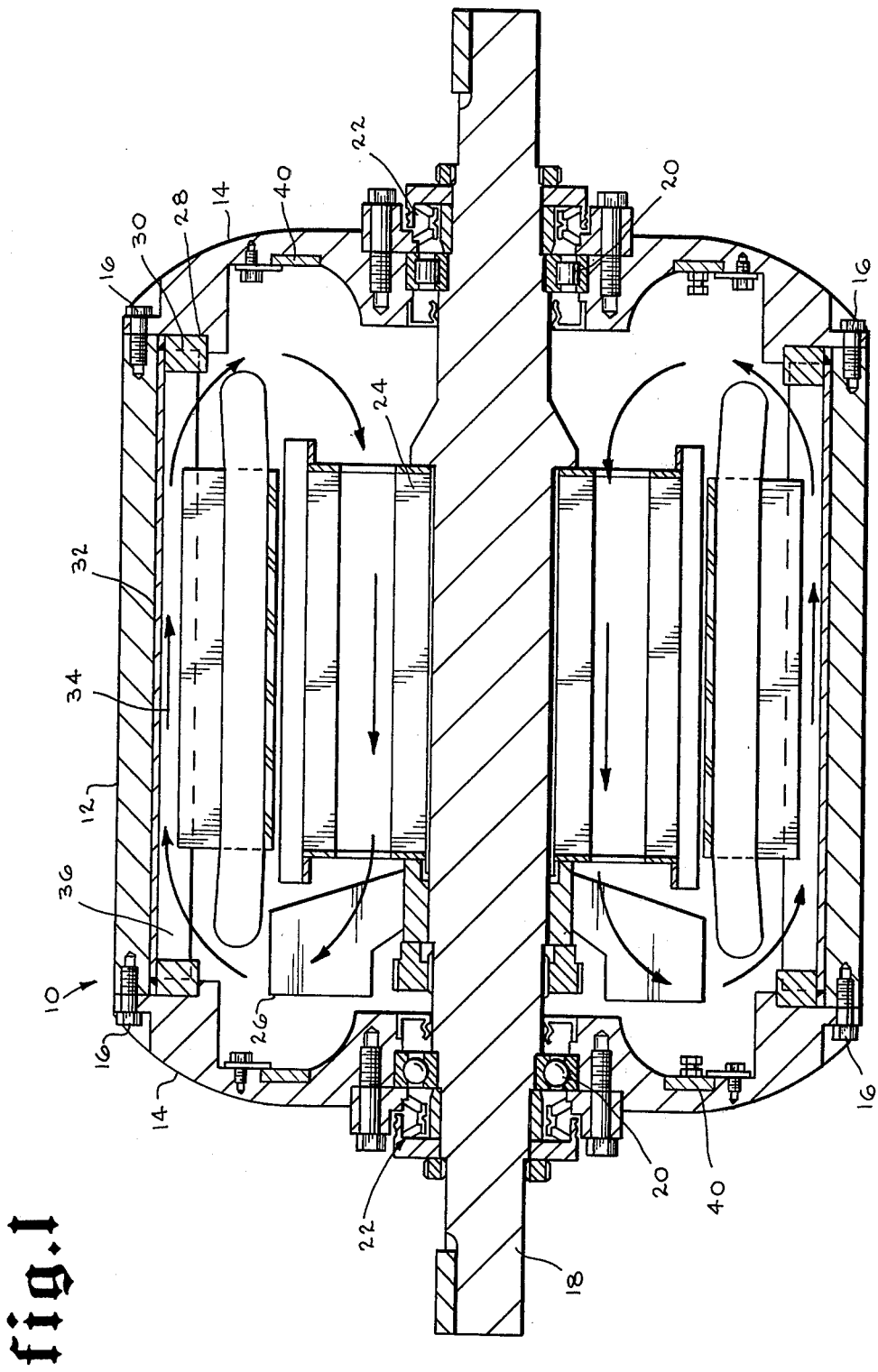
FIG. 1 is an axial cross-sectional view of the improved motor of the present invention.
Figure 2:
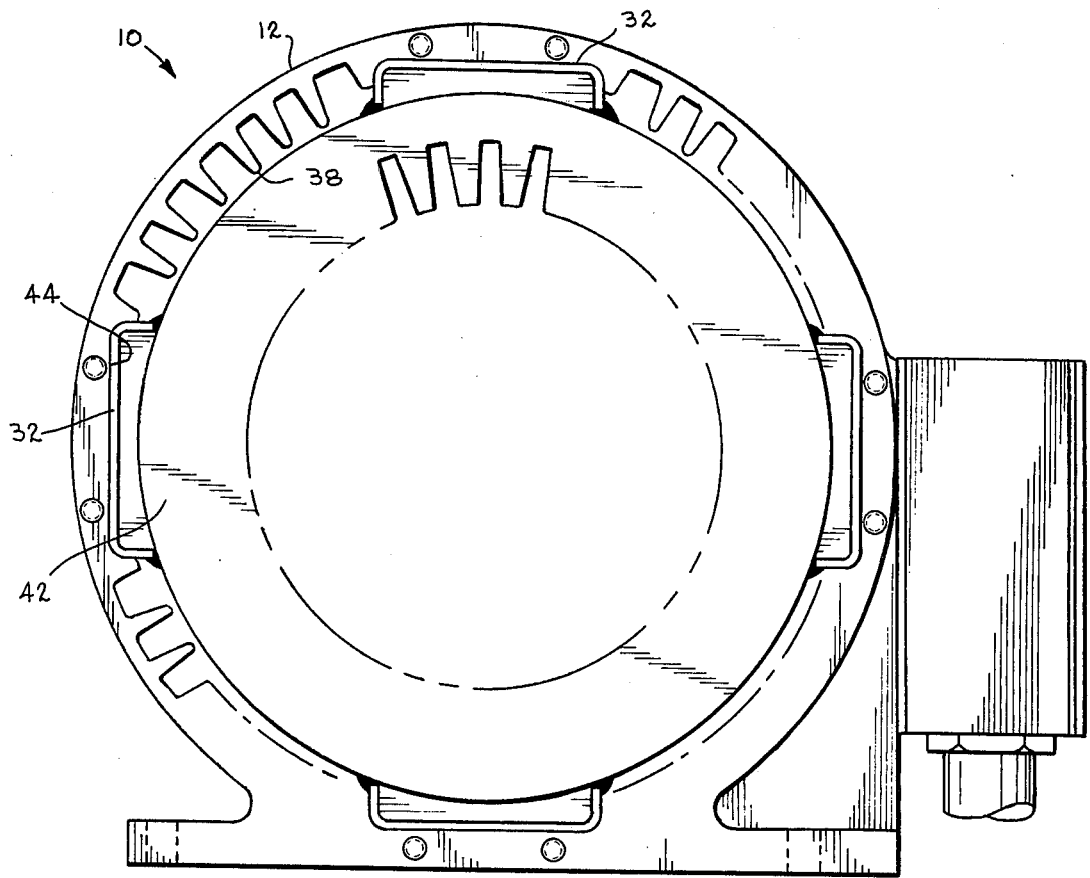
FIG. 2 is an end view of the motor with the end bell removed and the ring omitted to illustrate the stator assembly mounting.

The improved motor 10 of the present invention is a totally enclosed induction motor and includes a hollow cylindrical frame 12 which is closed at each end by the end bells 14 which are secured to the frame 12 by the fasteners 16. The rotor shaft 18 extends through each of the end bells 14 as shown and is rotatably mounted therein by suitable bearing means 20. The bearing means shown is provided with a bearing having lubricating oil retained therearound to assure continuous lubrication. Sealing means 22 provide seals between the end bells 14 and the shaft 18.

The rotor assembly 24 is mounted upon shaft 18 and rotates therewith. The air circulating vanes 26 are also mounted on the shaft 18 for rotation within the motor 10.

The end bells 14 define the annular shoulders 28 on which the rings 30 are positioned. The rings 30 engage the clips 32 which support the stator assembly 34. With the stator assembly mounting as shown and described, the frame 12 only performs the mechanical function of transmitting the stator torque to the mouting pad and the hereinafter described heat exchange function.

The rotor assembly 24, the stator assembly 34, the frame 12 and the end bells 14 define a plurality of air passages 36. The interior of the frame 12 is provided with ribs 38 so that air circulated through the air passages 36 by the vanes 26 transfers the heat generated in the motor to the frame 12.

When the motor 10 is operated under extreme cold and icy conditions, particularly when it is stopped the motor of the present invention makes provision to avoid problems resulting from such conditions. Such problems can result in a failure of the lubrication of the bearing means and possible seal failure resulting from the adhesion of ice formations. The annular heaters 40 are positioned on the inner surface of end bells 14 in surrounding relationship to the shaft 18. The heaters 40 may be of any suitable type, e.g., a resistance heater. With the heaters 40 positioned and operating under cold conditions they heat the bearing means 20 and the seal means 22 to assure proper operation and minimize friction. Also with the heaters 40 operating they heat the air within the motor and maintain the rotor and stator assemblies at a temperature approaching desired operating temperature. In some extreme cold conditions the heaters 40 may be used during operation to assure proper operating temperatures.

Figure 3:
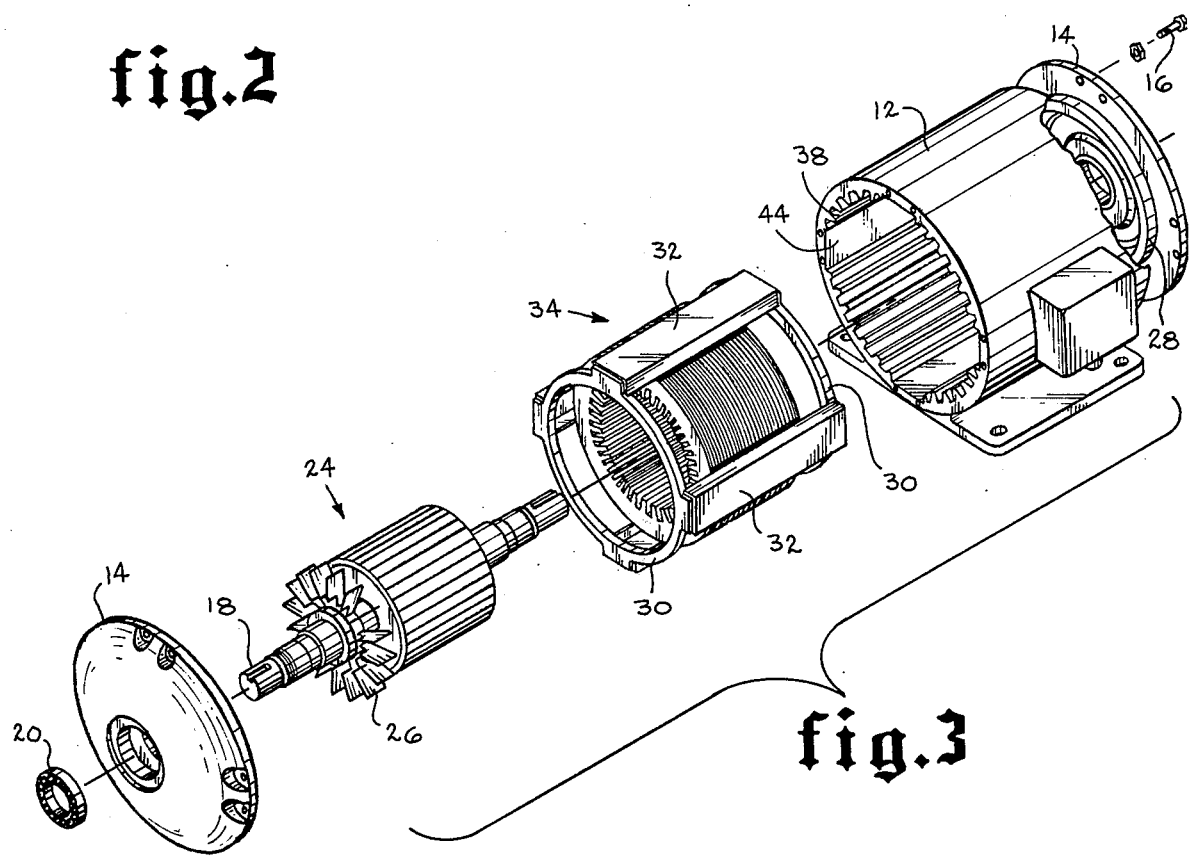
FIG. 3 is an exploded view to further illustrate the stator assembly mounting.

The stator assembly 34 as best seen in FIG. 3 is assembled with the clips 32 being secured along the outer edges of the stator 42 by welding. The rings 30 are welded with their projections extending into the clips 32. This stator assembly 34 is then inserted into the frame 12 with the clips 32 sliding in the grooves 44 defined in the frame 12. The engagement of the rings 30 on the shoulders of the end bells 14 assures that the stator assembly 34 will have the desired concentricity with respect to the rotor assembly 34 which is also supported from the end bells 14.

This particular stator assembly mounting provides for the transmission of the stator torque to the frame by the clips 32 but does not require that the frame provide the close tolerances for the rotor-stator concentricity which is provided by the end bells. Further such frame is readily removable allowing for easy and quick access to all components of the motor.

From the foregoing it can be seen that the improved induction motor of the present invention provides a simpler construction in which the stator assembly may be easily and quickly removed and operates with maximum effectiveness even when exposed to extremes of cold.

What is claimed is:

1. An induction motor, comprising
a cylindrical frame,
a pair of end bells adapted to be secured to the ends of said frame,
a rotor shaft rotatably supported in said end bells, an induction rotor mounted on said shaft,
an induction stator mounted to the end bells in surrounding relationship to said rotor,
a plurality of vanes mounted on said shaft,
said rotor, stator, frame and end bells defining a plurality of air passages through and around the ends of said rotor and said stator through which air is circulated by said vanes,
a pair of rings,
each of said end bells defining interior shoulders for engaging and aligning one of said rings around said rotor shaft,
said rings and said frame defining a plurality of slots,
a plurality of clips adapted to be received in said slots and to engage and support said stator,
seals in said shaft,
bearing means supporting said shaft in said end bells,
an annular heater supported on each of said end bells exposed to the interior of said motor,
means for retaining lubricating oil in said bearing means,
said heaters being positioned to heat said seals, the lubricating oil in said bearings and the air flowing through said air passages, and
said secured end bells and said frame totally enclosing said rotor and said stator.

2. An induction motor, comprising
a hollow cylindrical frame,
a pair of end bells,
means for securing said end bells to the ends of said frame,
an induction rotor,
means in said end bells for mounting said rotor within said frame,
an induction stator,
means contained within said end bells for mounting said stator within said frame in preselected relation to said rotor,
said frame with said end bells secured thereto totally enclosing said mounted rotor and said mounted stator, and
means for connecting said stator and said frame whereby stator torque is transmitted to said frame including,
a plurality of clips secured to the exterior of said induction stator in parallel relation to the axis of said stator,
said frame defining grooves extending along its interior surface to receive said clips whereby stator torque is transmitted to said frame by said clips.

3. An induction motor according to claim 2 including heating means mounted on the inner surface of each of said end bells and exposed to the interior of said motor.

4. An induction motor according to claim 3 wherein said heating means is positioned to heat the air within said motor and the rotor seals and the rotor bearings of said motor.

5. An induction motor, comprising
a hollow cylindrical frame,
a pair of end bells,
means for securing said end bells to the ends of said frame,
an induction rotor,
means in said end bells for mounting said rotor within said frame,
an induction stator,
means contained within said end bells for mounting said stator within said frame in preselected relation to said rotor,
said frame with said end bells secured thereto totally enclosing said mounted rotor and said mounted stator, and
means for connecting said stator and said frame whereby stator torque is transmitted to said frame,
said mounting means including
a pair of mounting rings, and
means for securing said mounting rings in concentric relationship to each end of said induction stator,
said end bells each defining an outwardly facing annular shoulder concentric with said rotor mounting means,
said mounting rings engaging said annular shoulders on said end bell on assembly of the components of said motor to maintain a concentricity between said rotor and said stator.

* * * * *